UNITED STATES PATENT OFFICE.

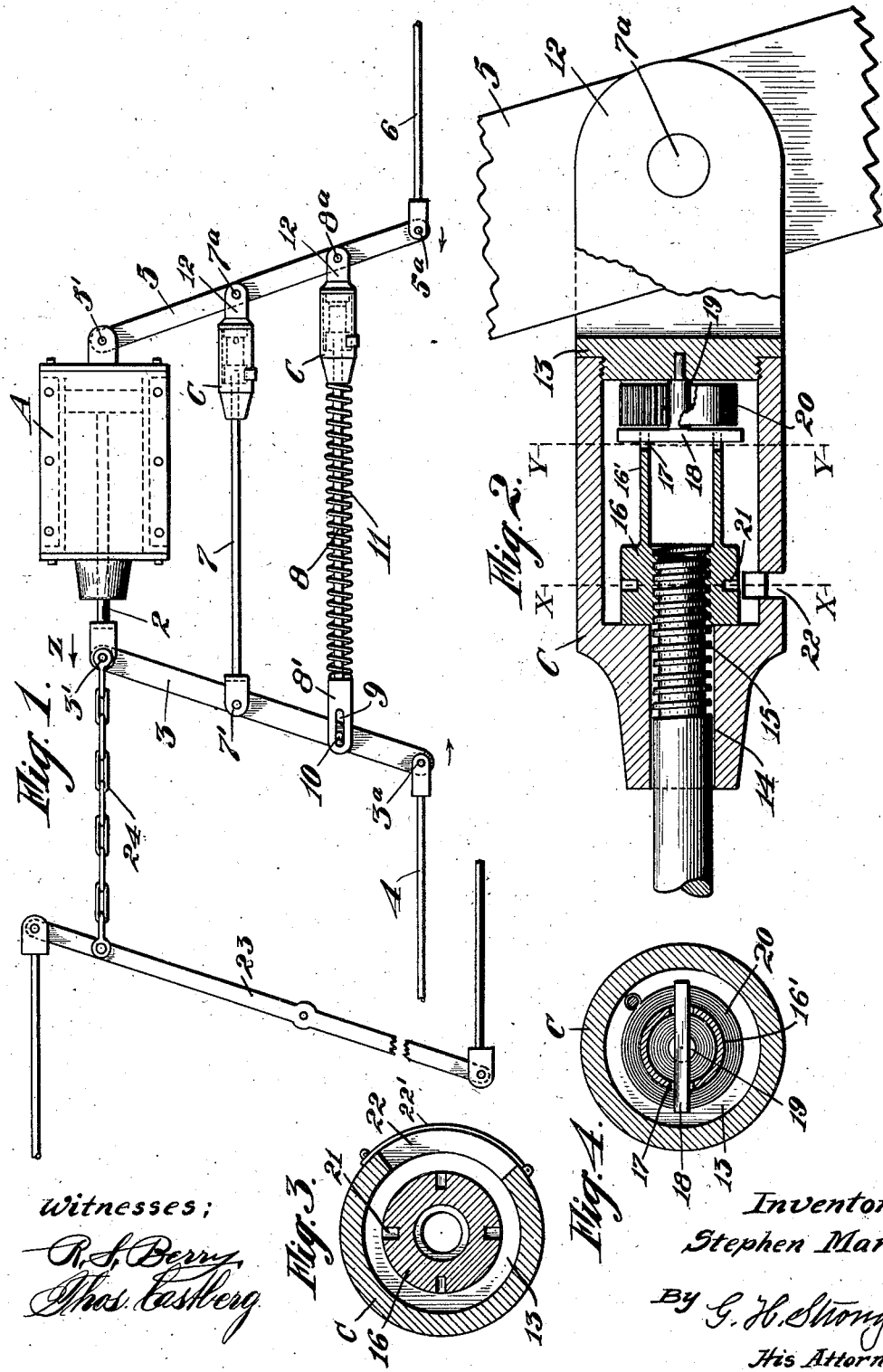

STEPHEN MARCO, OF SAN FRANCISCO, CALIFORNIA.

AUTOMATIC SLACK-ADJUSTER.

968,377.            Specification of Letters Patent.    Patented Aug. 23, 1910.

Application filed December 2, 1909. Serial No. 530,965.

*To all whom it may concern:*

Be it known that I, STEPHEN MARCO, a citizen of the United States, residing at the city and county of San Francisco and State of California, have invented new and useful Improvements in Automatic Slack-Adjusters for Car-Brakes, of which the following is a specification.

This invention relates to automatic slack-adjusters for car brakes.

It is the object of this invention to provide a brake slack adjuster which embodies means by which the length of the brake rod or rods will be automatically adjusted so as to compensate for the wearing of the brake-shoes, or other occurrences, which will make such adjustment necessary.

The invention consists of the parts, and the combination and construction of parts as hereinafter more fully described and claimed, reference being had to the accompanying drawings, in which—

Figure 1 is a plan view of the invention as applied. Fig. 2 is a longitudinal section of the adjuster. Fig. 3 is a cross section on the line $x$—$x$ Fig. 2. Fig. 4 is a cross section on the line $y$—$y$ Fig. 2.

In the drawings I have illustrated the invention as applied to a combined air-brake and hand-brake mechanism, but it is manifest that the device is applicable to car-brake mechanism of either the hand-brake or air-brake variety; and is especially suitable where a brake cylinder is employed.

The stroke of the piston in brake cylinders is limited, and should the brake shoes become worn excessively, the piston might travel out until it struck the back head before the shoes would contact the wheels, for that reason it is desirable to keep the travel of the brake cylinder piston as uniform as possible, which in most cases is about 8 inches. If the travel of the piston be less than the prescribed stroke, the shoes are apt to stand too near the wheels, while if greater than this, a small amount of extra wear of the shoes would allow the piston to strike the head, therefore I employ the following described invention for automatically taking up this slack.

A represents a brake cylinder of any suitable type in which a piston is adapted to be reciprocated in the usual manner. The cylinder A is mounted on the underside of a car, not necessary to be here shown.

The piston rod 2 is pivotally connected to one end of a floating lever 3, at 3′. The opposite end of lever 3 is pivoted at $3^a$ to a brake-rod 4, which leads to brake shoes, not shown, which are adapted to act upon the wheels at the rear end of a car, and may be of any suitable construction. A second lever or arm 5 is pivoted at one end to a fixed support, in this case shown as a yoke 5′ on the brake cylinder A. The opposite end of this arm 5 is pivoted at $5^a$ to a brake-rod 6, extending in the opposite direction to the rod 4, and leading to brake shoes on the forward end of a car.

7 is a rod which connects the lever 3 and arm 5, one end of the rod 7 terminating in a yoke 7′ which is pivoted to the floating lever 3, and the other end mounted in my automatic slack adjuster C as later described, which is pivoted at $7^a$ to the arm 5.

8 is a second rod, connecting the levers 3 and 5 in a similar manner as the rod 7, excepting that the yoke 8′ connecting the rod 8 to the lever 3, is slotted at 9 so as to be movable upon a pin 10 fixed to the lever 3, thereby allowing a certain amount of slack movement. A coil spring 11 surrounds the rod 8, and bears between the yoke 8′ and the slack adjuster C, which is constructed as shown in Fig. 2, in which C is the casing of the slack adjuster which may be of any suitable size and form, but is here shown as a cylindrical tubular shell, one end terminating in a yoke 12, which is adapted to be pivotally connected to the arm 5, as shown at $7^a$ and $8^a$.

The yoke 12 is formed on a cap 13 which is threaded into the shell C so as to form a tight closure. The other end of the shell C terminates in a tapered end portion, integral with the shell C, which is provided with a bore 14, through which the end of a rod, 7 or 8, may freely pass. The portion of the rod extending through the bore 14 into the interior of the casing C is threaded with square threads 15, which engage with the internal threads of a nut 16.

The nut 16 is provided with an unthreaded extended cylindrical portion 16′, which is notched at 17 so as to engage a bar 18 fixed on a spindle 19, swivelly mounted in the head 13.

A coil spring 20 has its inner end secured to the revoluble spindle 19, and its outer end fastened to the fixed head 13.

In operation, referring to Fig. 1, when the end 3′ of the floating lever 3 is moved outward in the direction indicated by the arrow Z, by the application of power, the action will be to turn the lever about its fulcrum point 7', and simultaneously move the arm 5 on its bearing at 5' so as to move the brake rods 4 and 6, on the outer ends of the levers 3 and 5, in the direction indicated by the arrows.

A certain amount of movement will be allowed the lever 3 before the rod 8 is effected, by reason of the slot 9. When the pin 10 contacts at the inner end of the slot 9, pressure will be exerted upon the rod 8, in opposition to the spring 11, which spring tends to exert a continuous pull upon the rod 8 in relation to the slack adjuster C.

The operation of the slack adjuster, referring to Fig. 2, is as follows: The connecting rods 7—8 are previously adjusted and set to the proper length, with the spring 20 wound upon the spindle 19 under tension. The action of this spring 20 is to screw the nut 16 upon the threaded end of the connecting rod therein, when there is an excess of slack. This excess of slack is denoted by the throw of the outer ends of the levers 3 and 5, which when the brake shoes are worn, would be greater than otherwise. This increased backward movement of the levers 3 and 5 causes the pin 10 to press upon the bar 8, and cause it to move into the casing C, whereupon the spring 20 will screw the nut 16 upon the bar 8 the length of the slack, thereby shortening the rod 8 that amount, so that the brake shoes will be held a proper distance from the wheels. When the levers 3 and 5 return to their normal position, the spring 11 exerts sufficient pull upon the bar 8 to bind the threads 15 in the nut 16, thereby preventing the latter being rotated by the spring 20.

The adjuster on the bar 7 is operated in a similar manner as that on the bar 8, to shorten the bar 7 in proportion to the shortening of the bar 8, a nut 16 screwing upon the bar 7, when the latter is relieved of strain by the pin 10 pressing upon the outer end of the slot 9.

Perforations 21 are formed in the periphery of the nut 16, so that it may be rotated to wind the spring 20, and at the same time unscrew from the rod therein, thereby increasing the connecting length of the rod, when desired.

A slot 22 is formed in the shell C through which any suitable tool may be inserted to engage the nut 16, a cover 22' being provided which is adapted to close the slot 22, as shown in Fig. 3.

I have shown in Fig. 1, the lever 3 connected to the rocking-bar 23 of a hand-brake, not shown, by a chain 24. The hand-brake may be constructed in any suitable manner, as the operation of the slack adjuster is not dependent on any particular form of brake construction other than that described.

No means are shown for returning the levers 3 and 5 to their normal position, as that is accomplished by means of springs on the brake shoes, or in any other manner common in car brake construction.

If the take up mechanism is located contiguous to the fulcrum of the pivoted lever, there will not be a sufficient space to take up for brake shoe wear, and the position of the lever will be so changed with relation to the floating lever that it will become measurably defective in action.

In my invention, the distance of the adjusting device is such that a very considerable wear and corresponding adjustment may take place without any such results.

Having thus described my invention, what I claim and desire to secure by Letters Patent is—

1. The combination with an air brake cylinder, fixed and floating levers, and brake rod connections with said levers, of a rod connecting the levers between their ends, said rod having screw-threads at one end, a casing, a contained nut in which the threaded end of the rod is turnable, means to turn the nut within the casing, means normally acting to hold the nut against turning, and means actuated by one of said levers for relaxing the holding means and thereby permitting the nut to be turned.

2. The combination with an air brake cylinder, fixed and floating levers, and brake rod connections with said levers, of a rod connecting the levers between their ends, said rod having screw-threads at one end, a casing, a contained nut in which the threaded end of the rod is turnable, means to turn the nut within the casing, said means consisting of a coil spring within the casing and a connection between one end of the spring and the nut, means acting normally to hold the nut from turning, and means for relieving the holding means to allow said spring to turn the nut.

3. The combination with an air brake cylinder, fixed and floating levers, brake rod connections with said levers, of a rod connecting the levers between their ends, said rod having screw-threads at one end, a casing, a contained nut in which the threaded end of the rod is turnable, a coil spring within the casing having one end connected with the nut, and a spiral tension spring producing a frictional contact between the screw-threads of the nut and bar.

4. The combination with an air brake cylinder, fixed and floating levers, brake rod connections with said levers, of a plurality of rods connecting the levers between their ends, said rods having screw-threads at one end, casings connected with one of the levers, nuts contained in the casings engaging the screw-threaded ends of the rods, coil springs connected to turn the nuts upon the rods, a spiral spring acting normally to produce a frictional contact to prevent the nuts from turning, and means to compress the spring and relieve the friction to allow the coil spring to act.

5. The combination with an air brake cylinder, fixed and floating levers, brake rod connections with said levers, of a plurality of rods connecting the levers between their ends, said rods having screw-threads at one end, casings connected with one of the levers, nuts contained in the casings engaging the screw-threaded ends of the rods, coil springs connected to turn the nuts upon the rods, a spiral normally compressed spring inclosing one of the rods, said rod having a slot, a pin fixed to the opposite lever and slidable in the slot, said pin contacting with the bottom of the slot and relieving the frictional contact of the screw-threads to allow the nut to turn and advance upon the rod to compensate for slack.

In testimony whereof I have hereunto set my hand in the presence of two subscribing witnesses.

STEPHEN MARCO.

Witnesses:
   CHARLES R. HOLTON,
   JOHN R. BRIDE.